US006742022B1

(12) United States Patent
King et al.

(10) Patent No.: US 6,742,022 B1
(45) Date of Patent: May 25, 2004

(54) CENTRALIZED SERVICE MANAGEMENT SYSTEM FOR TWO-WAY INTERACTIVE COMMUNICATION DEVICES IN DATA NETWORKS

(75) Inventors: Peter F. King, Half Moon Bay, CA (US); Stephen S. Boyle, Fremont, CA (US); Lawrence M. Stein, San Carlos, CA (US); Alain S. Rossmann, Palo Alto, CA (US); Bruce V. Schwartz, San Mateo, CA (US); Mark G. Lentczner, Mountain View, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/071,080

(22) Filed: Apr. 30, 1998

Related U.S. Application Data

(63) Continuation-in-part of application No. 08/570,210, filed on Dec. 11, 1995, now Pat. No. 5,809,415.

(51) Int. Cl.⁷ .......................... H04Q 7/00; H04L 12/66
(52) U.S. Cl. ................ 709/219; 709/244; 370/328; 370/401; 370/352
(58) Field of Search ................ 370/352, 466, 370/390, 392, 389, 400, 468; 709/203, 224, 219, 218, 217, 227, 229, 225, 206, 100, 230, 205, 223, 228, 313; 707/10

(56) References Cited

U.S. PATENT DOCUMENTS

| | | |
|---|---|---|
| 4,787,028 A | 11/1988 | Finfrock et al. |
| 4,812,843 A | 3/1989 | Champion, III et al. |
| 5,008,925 A | 4/1991 | Pireh |

(List continued on next page.)

FOREIGN PATENT DOCUMENTS

| | | |
|---|---|---|
| EP | 0646856 A2 | 4/1995 |
| EP | 0 691 619 | 1/1996 |
| EP | 0691619 A2 | 1/1996 |
| EP | 0646856 A3 | 12/1996 |

(List continued on next page.)

OTHER PUBLICATIONS

GloMop Group, "GloMop: Global Mobile Computing By Proxy", pp. 1–12, Sep. 13, 1995, University of California, Berkeley, California, XP–002094009.

S.S. Chakraborty, "Mobile Multimedia: In Context to ATM Transport and GSM/GPRS Mobile Access Networks", pp. 1937–1941, Helsinki University of Technology, Espoo, Finland, 1995.

Erlandson, C., et al. "WAP–The Wireless Application Protocol", Ericsson Review No. 4, 1998, 4 pages, (XP–000792053).

(List continued on next page.)

*Primary Examiner*—Hanh Nguyen
(74) *Attorney, Agent, or Firm*—Blakely, Sokoloff, Taylor & Zafman LLP

(57) ABSTRACT

A system configured to manage and process service requests within a data network. The system comprises a link server device that is configured to receive a service request from an interactive communication device, wherein the link server device attaches link server information to the service request indicating the operational capabilities of the link server device. A server device configured to receive the service request from the link server device and supply a service request response based upon information in the service request and the link server information. Wherein the link server executes a service command upon receipt of the service request response and supplies a status response to the interactive communication device.

29 Claims, 4 Drawing Sheets

U.S. PATENT DOCUMENTS

| | | | |
|---|---|---|---|
| 5,128,672 A | | 7/1992 | Kaehler |
| 5,220,674 A | * | 6/1993 | Morgan et al. ............. 709/223 |
| 5,329,619 A | * | 7/1994 | Page et al. .................. 709/203 |
| 5,335,276 A | | 8/1994 | Thompson et al. |
| 5,465,401 A | | 11/1995 | Thompson |
| 5,491,605 A | | 2/1996 | Hughbanks et al. |
| 5,491,745 A | | 2/1996 | Roeder |
| 5,506,961 A | * | 4/1996 | Carlson et al. ............. 709/229 |
| 5,548,636 A | | 8/1996 | Bannister et al. |
| 5,548,723 A | * | 8/1996 | Pettus ........................ 709/228 |
| 5,555,446 A | | 9/1996 | Jasinski |
| 5,560,008 A | | 9/1996 | Johnson et al. |
| 5,577,100 A | | 11/1996 | McGregor et al. |
| 5,577,103 A | | 11/1996 | Foti |
| 5,577,209 A | | 11/1996 | Boyle et al. |
| 5,579,535 A | | 11/1996 | Orlen et al. |
| 5,581,595 A | | 12/1996 | Iwashita et al. |
| 5,606,786 A | | 3/1997 | Presby |
| 5,608,786 A | | 3/1997 | Gordon |
| 5,623,605 A | | 4/1997 | Keshav et al. |
| 5,625,605 A | | 4/1997 | Sullivan et al. |
| 5,634,127 A | * | 5/1997 | Cloud et al. ................ 709/313 |
| 5,671,354 A | | 9/1997 | Ito et al. |
| 5,673,322 A | | 9/1997 | Pepe et al. |
| 5,675,507 A | | 10/1997 | Bobo, II |
| 5,708,828 A | | 1/1998 | Coleman |
| 5,724,575 A | * | 3/1998 | Hoover et al. ............. 709/205 |
| 5,727,159 A | | 3/1998 | Kikinis |
| 5,740,252 A | | 4/1998 | Minor et al. |
| 5,742,668 A | | 4/1998 | Pepe et al. |
| 5,742,905 A | | 4/1998 | Pepe et al. |
| 5,745,706 A | | 4/1998 | Wolfberg et al. |
| 5,751,798 A | | 5/1998 | Mumick et al. |
| 5,809,415 A | * | 9/1998 | Rossmann ................... 370/352 |
| 5,812,768 A | * | 9/1998 | Page et al. .................. 709/228 |
| 5,822,521 A | * | 10/1998 | Gartner et al. ............. 709/230 |
| 5,841,764 A | | 11/1998 | Roderique et al. |
| 5,852,717 A | * | 12/1998 | Bhide et al. ................ 709/203 |
| 5,854,936 A | | 12/1998 | Pickett |
| 5,867,153 A | | 2/1999 | Grandcolas et al. |
| 5,884,284 A | | 3/1999 | Peters et al. |
| 5,887,249 A | | 3/1999 | Schmid |
| 5,909,485 A | | 6/1999 | Martin et al. |
| 5,918,013 A | | 6/1999 | Mighdoll et al. |
| 5,940,589 A | | 8/1999 | Donovan et al. |
| 5,943,399 A | | 8/1999 | Bannister et al. |
| 5,958,006 A | | 9/1999 | Eggleston et al. |
| 5,995,606 A | * | 11/1999 | Civanlar et al. ............ 370/352 |
| 6,009,422 A | * | 12/1999 | Ciccarelli ........................ 707/4 |
| 6,031,904 A | * | 2/2000 | An et al. ..................... 370/352 |
| 6,035,189 A | | 3/2000 | Ali-Vehmas et al. |
| 6,049,711 A | | 4/2000 | Ben-Yehezkel et al. |
| 6,049,821 A | * | 4/2000 | Theriault et al. ........... 709/203 |
| 6,055,441 A | * | 4/2000 | Wieand et al. .............. 455/557 |
| 6,058,422 A | | 5/2000 | Ayanoglu et al. |
| 6,065,120 A | | 5/2000 | Laursen et al. |
| 6,085,105 A | | 7/2000 | Becher |
| 6,108,554 A | | 8/2000 | Kawamoto |
| 6,119,137 A | | 9/2000 | Smith et al. |
| 6,119,155 A | | 9/2000 | Rossmann et al. |
| 6,122,403 A | | 9/2000 | Rhoads |
| 6,131,067 A | | 10/2000 | Girerd et al. |
| 6,138,158 A | * | 10/2000 | Boyle et al. ................ 707/225 |
| 6,157,823 A | | 12/2000 | Fougnies et al. |
| 6,161,140 A | | 12/2000 | Moriya |
| 6,167,253 A | | 12/2000 | Farris et al. |
| 6,185,184 B1 | | 2/2001 | Mattaway et al. |
| 6,233,608 B1 | * | 5/2001 | Laursen et al. ............. 709/203 |
| 6,237,031 B1 | * | 5/2001 | Knauerhase et al. ........ 709/221 |
| 6,247,048 B1 | * | 6/2001 | Greer et al. ................. 709/219 |
| 6,263,437 B1 | * | 7/2001 | Liao et al. ................... 713/169 |

FOREIGN PATENT DOCUMENTS

| | | |
|---|---|---|
| EP | 0691619 A3 | 6/1997 |
| EP | 0812120 A2 | 12/1997 |
| EP | 0 893 760 A2 | 7/1998 |
| EP | 0 893 760 | 1/1999 |
| EP | 0 954 147 A2 | 4/1999 |
| EP | 0812120 A3 | 5/1999 |
| JP | 59-41047 | 3/1984 |
| JP | 5-35421 | 2/1993 |
| JP | 5-233191 | 9/1993 |
| JP | 6-110637 | 4/1994 |
| JP | 6-175764 | 6/1994 |
| JP | 7-13671 | 1/1995 |
| JP | 7-263187 | 10/1995 |
| WO | WO 93/16550 A1 | 8/1993 |
| WO | WO 96/13814 A1 | 5/1996 |
| WO | WO 97/14244 A1 | 4/1997 |
| WO | WO 97/27546 A1 | 7/1997 |
| WO | WO 97/41654 A1 | 11/1997 |

OTHER PUBLICATIONS

Erlandson C. et al: "WAP—the Wireless Application Protocol" Ericsson Review, SE, Ericsson, Stockholm, No. 4, 1998, pp. 150–153, XP 000792053.

M.F. Kaashoek et al., "Dynamic Documents: Mobile Wireless Access to the WWW", pp. 179–184, Dec. 8, 1994, XP0002016896.

Japanese Publication, Larry Aronson, "Introduction to HTML", Jul. 1, 1995.

Japanese Publication, "Introduction to HTML–WWW Publishing", pp. 9, 12, 14, 15, 20, 32–34, 162–163, 269, 286, 287, and 270, Jun. 30, 1995.

G.M. Voelker et al., "Mobisaic: An Information System for a Mobile Wireless Computing Environment", vol. 5, No. 10, pp. 185–190, Jan. 1, 1995, XP002062595.

Japanese Article, "Mosaic", Unix Magazine, pp. 36–44, Mar. 1994.

Japanese Publication, "Nifty Serve", pp. 14,34,39, and 158–159 Oct. 5, 1992.

Nekkei Multimedia Magazine, pp. 109–111, Nov. 1995.

Mac Power Magazine, pp. 105 and 268, Jun. 1995.

M. Liljeberg et al., "Optimizing World–Wide Web for Weakly Connected Mobile Workstations: An Indirect Approach" International Workshop on Services in Distributed and Networked Environments, pp. 132–139, Jun. 5, 1995, XP000764774.

S. Gessler et al., "PDAs as Mobile WWW Browsers", Computer Networks and ISDN Systems, vol. 28, No. 1, pp. 53–59, Dec. 1, 1995, XP004001210.

"HDTP Specification," *Unwired Planet, Inc.*, Version 1.1, Part No. HDTP–SPEC–DOC–101, Jul. 15, 1997, pp. 1–40.

"HDML 2.0 Language Reference," *Unwired Plant, Inc.*, Version 2.0, Part No. HDMLREf–DOC–200, Revision D, Jul. 1997, pp. 1–56.

Meyer M. et al., "The On–the–Move Concept for Mobile Middleware", pp. 373–378, Sep. 21, 1997, Ericsson Eurolab Deutschland GmbH, Germany, XP–00704489.

* cited by examiner

CENTRALIZED SERVICE MANAGEMENT SYSTEM FOR TWO-WAY INTERACTIVE COMMUNICATION DEVICES IN DATA NETWORKS

The present application is a continuation-in-part of U.S. application Ser. No.: 08/570,210, now U.S. Pat. No.: 5,809,415, entitled "Method and architecture for an interactive two-way data communication network" filed on Dec. 11, 1995 by one of the co-inventors hereof.

FIELD OF THE INVENTION

The present invention relates to data communications between server computers and client computers within the context of data networks. More specifically, a method and apparatus for managing two-way interactive communication devices over the data networks utilizing a link server; wherein the two-way interactive communication devices, such as mobile devices, cellular phones, landline telephones and Internet appliance controllers, have generally limited computing resources such as computing power, memory and graphical display capability.

BACKGROUND

The Internet is a rapidly growing communication network of interconnected computers and computer networks around the world. Together, these millions of connected computers form a vast repository of hyperlinked information that is readily accessible by any of the connected computers from anywhere at any time. To provide mobility and portability of the Internet, wireless Internet computing devices were introduced and are capable of communicating, via wireless data networks, with the computers on the Internet. With the wireless data networks, people, as they travel or move about, are able to perform, through the wireless computing devices, exactly the same tasks they could do with computers on the Internet.

Regular mobile phones can return calls, check voice mail or enable users to be available for teleconferences anywhere at any time. However, new two-way interactive communication devices, such as mobile devices or mobile phones, would meld voice, data, and personal digital assistants (PDA) functionality into a single portable device that is not just reactive to calls but also proactive, accessing a myriad of public and enterprise information services in the Internet. The evolution of the interactive mobile device or mobile phones has been evidently fueled by the demand of users for immediate access to the information they are looking for in the Internet.

The client computer, or two-way communication device, which may constitute a mobile computing device, a cellular phone, a landline telephone, or an Internet appliance controller, typically has very limited computing and storage capabilities. The limited computing and storage capabilities, however, allows for increased portability and mobility, as such typical two-way communication devices are designed small in size, light in weight, low in power consumption, and as economically as possible. Such designs, having very limited computing power and storage capacity, are often classified as thin designs, the thin designs are typically equivalent to less than one percent of what is provided in a typical desktop or portable computer and the memory capacity thereof is generally less than 250 kilobytes. Accordingly, the thin client devices do not have extra memory space to store large amount of data.

Furthermore, currently available thin design client computers (i.e. thin clients) generally only provide for the browsing of information services contained on a network, such as the Internet, due to their limited computing and storage capabilities. Accordingly, the thin client typically can not support or provide ancillary services, such as faxing, printing, downloading, etc., due in part to the limited computing and storage capabilities associated with these devices. Such ancillary services typically can not, and should not, be implemented by the thin client as they would correspondingly increase the complexity of the thin client, thereby increasing the size, weight, and power consumption of the thin client. Moreover, such ancillary services require and generate large amount of data that should not be sent over wireless networks, due to cost, data loss, and logistical considerations.

Further, such ancillary services are difficult to implement on the web server side, as the thin client would typically incur a service cost from the web server for performing a particular service, such as faxing, on behalf of a thin client request. Alternately, in the case of a print request from a thin client, the web server would require access to the thin client's network in order for the web server to send a print request to a thin clients designated printer.

To illustrate the problem, consider the situation in which a thin client wishes to fax an e-mail message from a mail service to another destination. One proposed solution is for the mail service to download the entire message (with attachments) to the thin client, create a fax image of the e-mail message, and then send the fax directly from the thin client to the desired destination. The shortcomings of this approach, however, is that the entire e-mail message must be downloaded over the wireless network, along with any associated attachments. Further, the thin client must have sufficient memory to store the entire e-mail message (with attachments), must be able to render the e-mail and attachments as a facsimile image, and must be able to place facsimile calls via the voice network. As a result, the complexity of the thin client is necessarily increased by the corresponding facilities which would be required in order to support such operations. Moreover, as new attachment types are introduced it is unlikely they will be supported by the existing thin client, as the thin clients are often difficult or impossible to. upgrade with new software.

Another proposed solution is for the mail service to render the e-mail message and fax it from the mail service application to the desired destination. Accordingly, this would remedy the problem of transferring data over the wireless network, thereby reducing the complexity associated with such a transfer, which would in turn allow the operation and design of the thin client to remain relatively simple. The sending of data by fax, in the current example, however, incurs some type of service cost. Accordingly, the typical service provider will require some means to recover the costs associated with such a service, typically by charging the user/client a service fee, as in the current example, by charging the user for each fax sent. As such, the mail service or web server would be required to establish a "relationship" (i.e.-service account) with each user/client in order to implement a service fee accounting system for recouping associated service fees. This proposed solution, however, has limitations in that the user would be required to establish a "relationship" (i.e.-service account) with every web service for which the user/client wants a certain service performed. Further, each web service selected to provide an ancillary service, such as faxing, would have to establish a billing and accounting system in order to recover costs associated with providing the services, along with establishing an infrastructure for providing such services.

Thus, there is a great need for providing thin clients with the ability to generate requests for data and direct the result of such requests to an intermediate device or link server which could process the result in accordance with a certain request protocol. Such a system would allow the thin client to remain simple in design and would thereby only require a single "relationship" (i.e.-service account) to be established between the thin client and the intermediate device or link server. Further, the intermediate device or link server would be relatively easy to augment in order to provide additional features in the future based on a desired service requested by a user/client.

SUMMARY OF THE INVENTION

The present invention is directed to a system configured to manage and process service requests within a data network. The system comprises a link server device that is configured to receive a service request from an interactive communication device, wherein the link server device attaches link server information to the service request indicating the operational capabilities of the link server device. A server device configured to receive the service request from the link server device and supply a service request response based upon information in the service request and the link server information. Wherein the link server executes a service command upon receipt of the service request response and supplies a status response to the interactive communication device.

In one embodiment of the invention, the service request response comprises a multi-part response, the multi-part response comprising service request data and the status response.

In another embodiment of the invention, the status response supplied to the interactive communication device contains the service request data.

In yet another embodiment of the invention, a service device is coupled to the link server device, wherein the service device performs the service indicated by the service command.

In yet still another embodiment of the invention, a system containing program code of managing and processing service requests within a data network, the system comprising:

first program code for supplying a service request to a link server device, wherein the link server device comprises program code for attaching link server information to the service request, the link server information indicating the operational capabilities of the link server device;

second program code for supplying the service request to a server device configured to supply a service request response based upon information contained in the service request and the link server information; wherein the service request response comprises a multi-part response including service request data and a status response;

third program code for executing a service command upon the receipt of the service request response; and fourth program code for supplying a status response to a source of the service request.

An object of the present invention is to provide thin clients with the ability to generate requests for data and direct the result of such requests to an intermediate device or link server which can process the result in accordance with a certain request protocol.

Another object of the present invention is to provide a system that would allow the thin client to remain simple in design and only require a single "relationship" (i.e.-service account) to be established between the thin client and the intermediate device or link server.

Yet another object of the present invention is to provide a link server capable of executing service requests and providing a variety of ancillary services.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Notation and Nomenclature

In the following detailed description of the present invention, numerous specific details are set forth in order to provide a thorough understanding of the present invention.- However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following are presented largely in terms of procedures, steps, logic blocks, processing, and other symbolic representations that resemble of data processing devices coupled to networks. These process descriptions and representations are the means used by those experienced or skilled in the art to most effectively convey the substance of their work to others skilled in the art. The present invention is a centralized service management system for two-way interactive communication devices in data networks. The method and apparatus along with the architecture to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

The Preferred Embodiment

Figure 1:
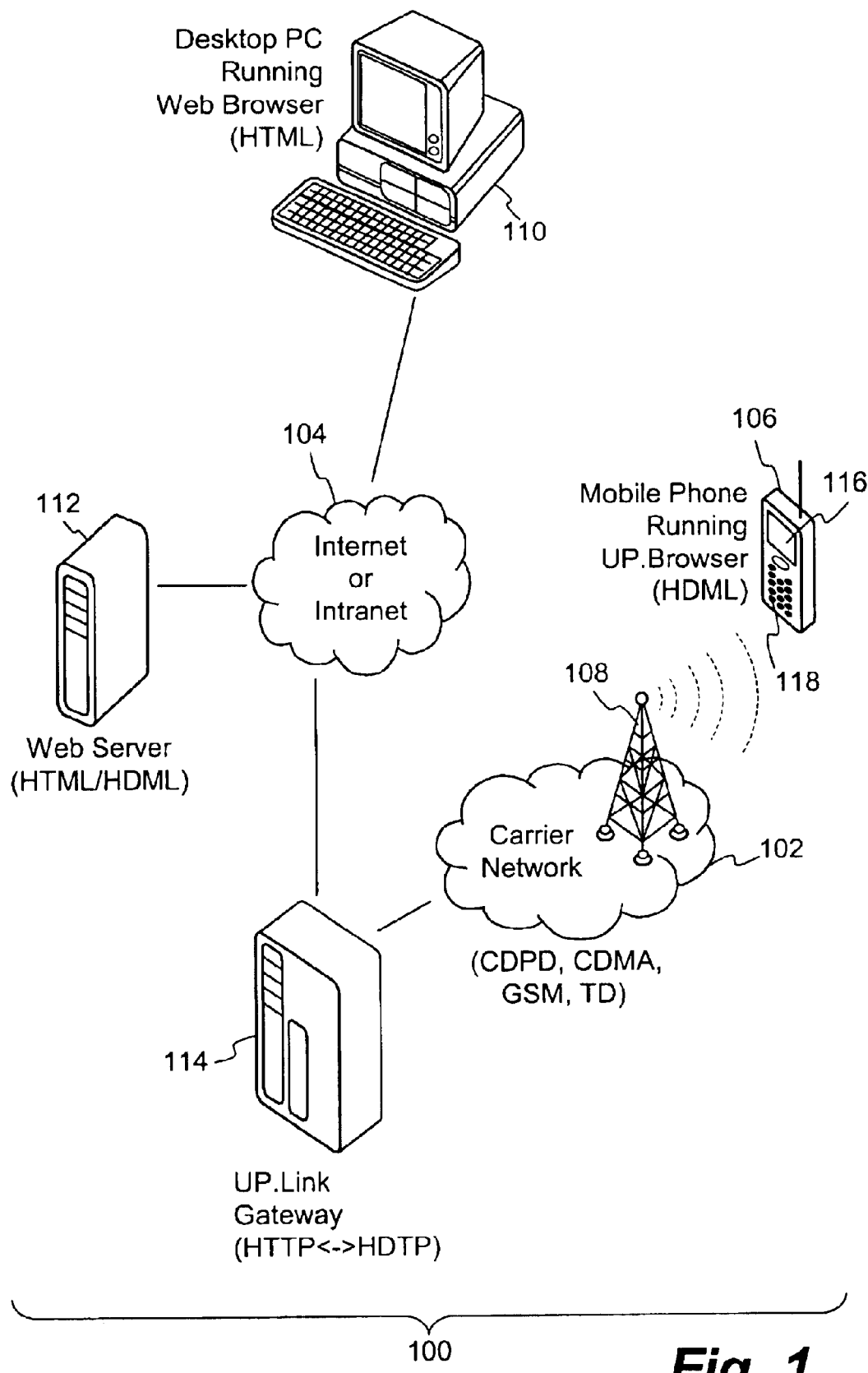
FIG. 1 illustrates a schematic configuration in which the present invention may be practiced.

Referring now to the drawings, in which like numerals refer to like parts throughout the several views. FIG. 1 illustrates a schematic configuration in which the present invention may be practiced. A data network 100 comprises an airnet 102 that is generally called a wireless network and a landnet 104 that is generally a landline network, each acting as a communication medium for data transmission there through. Airnet 102, in which the data transmission is via the air, is sometimes referred to as a carrier network because each airnet is controlled and operated by a carrier, for example AT&T and GTE, each having its own communication scheme, such as CDPD, CDMA, GSM and TDMA for airnet 102. The landnet 104 or Internet, used interchangeably herein, may be the Internet, the Intranet, or other private networks or databases.

Referenced by 106 is one of the two-way interactive communication devices that can be a mobile device, a cellular phone, a landline telephone or a wireless capable remote controller, capable of communicating, via airnet 102, with an antenna 108 that also represents a carrier infrastructure. It is generally understood that the carrier infrastructure 108 serves simultaneously a plurality of the two-way interactive communication devices, of which only one mobile device 106 is shown in the figure. Similarly, connected to Internet 104 are a plurality of desktop personal computers (PC) 110 and a plurality of server computers 112, though only one representative, respectively, is shown in the figure. PC 110, as shown in the figure, may be a personal computer SPL 300 from NEC Technologies Inc. which runs a HTML Web browser via the Internet 104 using HTTP to access information stored in web server 112 that may be a workstation from SUN Microsystems Inc. It is understood to those skilled in the art that PC 110 can store accessible information therein so as to become a web server as well.

Between the Internet 104 and the airnet 102 there is a link infrastructure that comprises a link server device 114 and the carrier infrastructure 108. Link server device 114, also referred to as a gateway server, may be a workstation or a personal computer configure to perform a mapping or translation function, for example, mapping from one protocol to another, thereby the mobile device 106 can be in communication with any one of the servers 112 or the PCs 110, respectively via the carrier infrastructure 108. Additionally, as will be discussed in further detail in the following description, the link server device 114 is configured to execute a function or provide a service in connection with service request data which is received in response to a service request initiated by a user of the mobile device 106.

The communication protocol in the Internet 104 is the well known HyperText Transfer Protocol (HTTP) or HTTPS, a secure version of HTTP, and runs on TCP and controls the connection of a well known HyperText Markup Language Web browser, or HTML Web browser in PC 110, to Web server 112, and the exchange of information there between. The communication protocol between mobile device 106 and link server 114 via airnet 102 is Handheld Device Transport Protocol (HDTP), (formerly known as Secure Uplink Gateway Protocol (SUGP)), which preferably runs on User Datagram Protocol (UDP) and controls the connection of a HDML Web browser in mobile device 106, to server 114, where HDML stands for Handheld Device Markup Language. HDML, similar to that of HTML, is a tag based document language and comprises a set of commands or statements specified in a card that specifies how information displayed on a small screen of the mobile device 106. Normally a number of cards are grouped into a deck that is the smallest unit of HDML information that can be exchanged between the mobile device 106 and the link server 114. The specifications of HDTP, entitled "HDTP Specification", and HDML, entitled "HDML 2.0 Language Reference" are enclosed and incorporated herein by reference in its entirety. The HDTP is a session-level protocol that resembles HTTP but without incurring the overhead thereof and is highly optimized for use in thin devices, such as the mobile devices, that have significantly less computing power and memory than that in a desktop personal computer. Further it is understood to those skilled in the art that the UDP does not require a connection to be established between a client and a server before information can be exchanged, which eliminates the need of exchanging a large number of packets during a session creation between a client and a server. Exchanging a very small number of packets during a transaction is one of the desired features for a mobile device with very limited computing power and memory to effectively interact with a landline device.

Further, the carrier infrastructure 108 and mobile devices, in FIG. 1, represents a wireless network system that may be a GSM or CDPD network system depending on the transmission protocol used by the carrier in the network system. A wireless network system is generally composed of three broad parts; mobile stations, a base station and an operation and maintenance center. The mobile stations are, for example, a plurality of the mobile devices carried by users, the base station controls radio or telecommunication links with the mobile devices. The operation and maintenance center comprises a central component that is a mobile switching center that performs the switching of calls between the mobile devices and other fixed or mobile network users. Further the operation and maintenance center manages mobile services, such as authentication and oversees the proper operation and setup of the GSM network. Each of the hardware components in the three broad parts are known to those skilled in the art and is not to be described herein to avoid unnecessarily obscuring aspects of the present invention.

To facilitate the description of the disclosed system, however, it is deemed necessary to recite some of the features in mobile device 106 that make the disclosed system work more efficiently. According to one embodiment, mobile phone 106 comprises a display screen 116 and a keyboard pad 118 that allow a user thereof to communicate interactively with the mobile phone. The hardware components including a microcontroller, a ROM and a RAM, referring to working memory, in mobile phone 106 are known to those skilled in the art. The compiled and linked processes of the present invention are typically stored in the ROM as a client module that causes mobile device 106 to operate with link server 114. With display screen 116 and keypad 118, a user of mobile device 106 can interactively communicate with link server 114 over airnet 102. Upon activation of a predetermined key sequence utilizing keypad 118, for example, the microcontroller initiates a communication session request to link server 114 using the client module in the ROM. Upon establishing the communication session, mobile device 106 typically receives a single HDML deck from link server 114 and stores the deck as cached in the RAM. As described above, an HDML deck comprises one or more cards and each card includes the information required to generate a screen display on display screen 116. The number of cards in a card deck is selected to facilitate efficient use of the resources in mobile device 106 and in airnet network 102.

Figure 2:
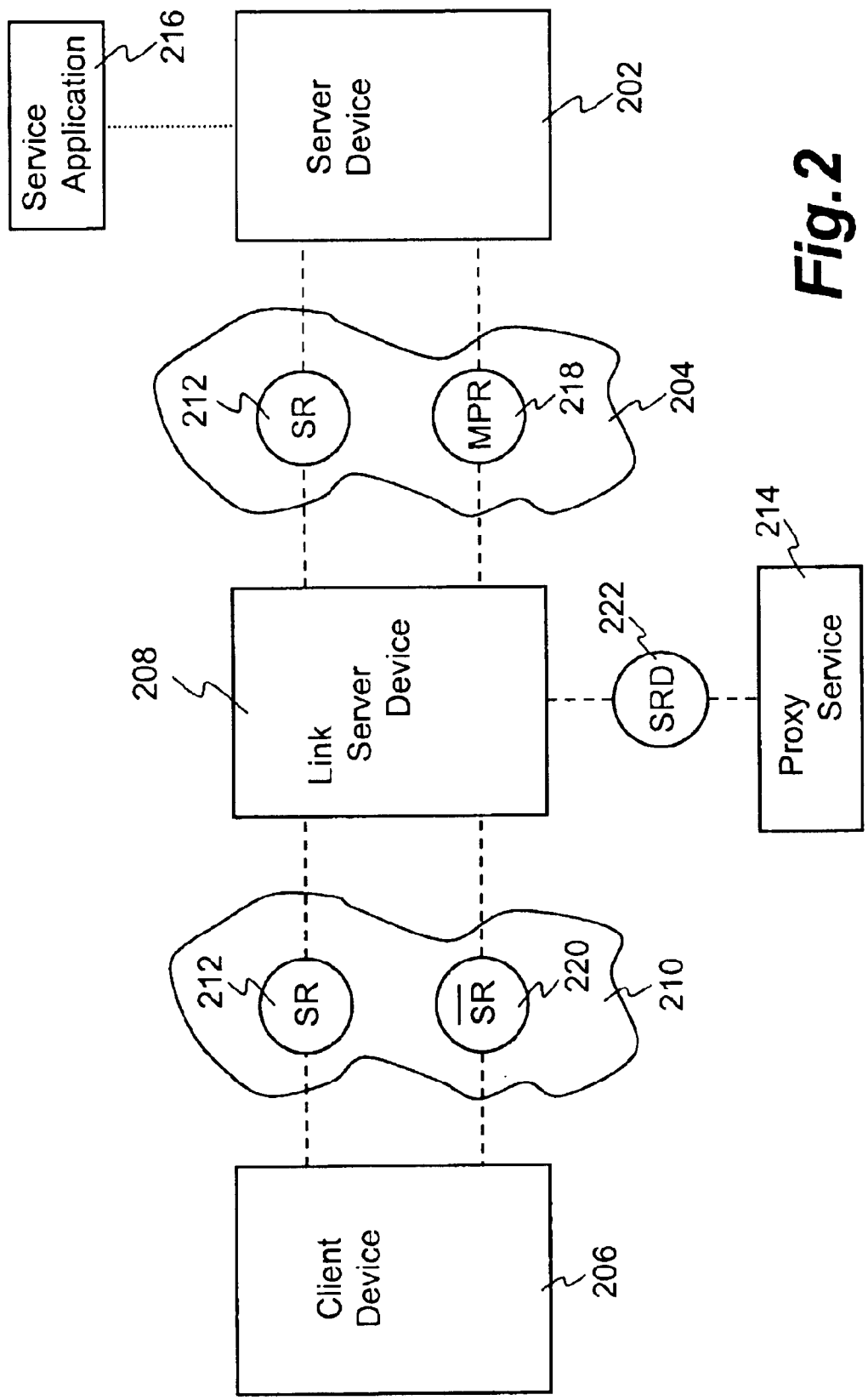
FIG. 2 illustrates, in a functional block diagram, an embodiment of a communication system capable of implementing the teachings of the present invention.

FIG. 2 illustrates a simplified functional block diagram of a communication system 200 capable of implementing the teachings of the present invention. A Web server device 202, or simply server device 202, provides accessible information to other computing devices via Internet 204. A mobile device or client device 206 accesses, over an airnet 210, the information in web server device 202 via a link or link server device 208 that is coupled to Internet 204. It should be noted that the communication between mobile device 206 and link server 208 is via the carrier infrastructure which is not part of the invention, and therefore not shown in FIG. 2, so as to avoid unnecessarily obscuring the inventive aspects of the present invention.

Further, to avoid possible ambiguities in further description of the present invention, a server device, such as server device 202 and link server device 208, means a piece of hardware equipment that comprises one or more microprocessors, working memory, buses and necessary interface and other components that are familiar to those skilled in the art, while a server module means compiled and linked processes of the disclosed system loaded into the working memory to perform designated designed functions, according to the invention, through the parts and components in the server device. The same distinction is equally applied to mobile devices, referred to, for example, client device 206, and the client module as stated before.

With reference to FIG. 2, the user of the client device 206 first initiates a communication session request via the client device 206, through airnet 210, to the link server 208. Once the communication session is established, the user of the client device 206 selects or inputs service selection data, which corresponds to select data contained in a network or database, into a selectable user interface contained in the client device 206. Each selectable user interface is associated with a corresponding service application, which is likewise selectable, used in the processing of different service requests. As such, the user of the client device 206 selects a task or function, which is to be applied to select data, by selecting or inputting the corresponding service selection data associated with the desired task or function into the user interface. Correspondingly, the client device 206 generates a service request 212 based upon the service selection data selected from, or inputted into, the user interface of the client device 206.

The service request 212 contains service information, generated from the service selection data, comprised of identification information corresponding to the select data, such as a URL (Universal Resource Locator), or other identifier, which identifies or describes the select data or information contained in a particular database or network. Additionally, the service information indicates the type of service requested (i.e.: print, fax, download, etc.), the identification of the data type associated with the service request (i.e.: e-mail message, HTML document, data file, etc.), and the destination for a response to the service request (fax number and location, printer identification, computer or database identification, etc.).

Upon generation of the service request 212, the client device 206 supplies or transmits the service request 212, containing the service information, to the link server 210. Accordingly, upon receipt of the service request 212, the link server 208 converts the transfer protocol associated with the service request 212 from an HDTP protocol to an HTTP protocol. Further, the link server 208 attaches link server information to the service request 212 which indicates the types of services or functions that the link server device 208 is capable of processing or executing with respect to the selected service request 212. Additionally, the link server information identifies the content-types of data that the link server device 208 is able to accept and process.

The service request 212, containing the service information and link server information, is then forwarded, via the Internet 204, from the link server device 208 to the server device 202. Accordingly, the server device 202 selects and uses a particular service application 216 associated with the service request 212 in order to process the service request 212. Correspondingly, the server device 202, through the associated service application 216, uses the service information contained in the service request 212 to locate the select data or service request data, in an associated network or database, which corresponds to the identification information contained in the service information.

The server device 202 then supplies the service request data to a selected service application 216 which processes the service request data in accordance with the link server information and the service information contained in the service request 212. As mentioned above, the link server information indicates the types of services or functions, associated with the service request 212, that the link server device 208 is capable of processing, in addition to the content-types of data that the link server device 208 is able to accept and process. Correspondingly, the service application 216, after locating the service request data, processes the service request data into an appropriate format for use by the link server 208, based upon one of the content-types of data that the link server device 208 is able to accept and process. Further, the server device 202, via the service application 216, uses the service information when formatting the service request data to indicate the type of service requested (service command), to the link server 208.

After the service application 216 has processed the service request data into an appropriate format for use by the link server 208, the server device 202, through service application 216, generates a status response 220 (HDML response) which is eventually supplied to the client device 206, and displayed to the user thereof, upon completion of the service request 212. The status response 220 supplies the client device 206 with information indicating that the service request 212 has been fully processed by the link server 208. Accordingly, the server device 202 combines the service request data (i.e.: actual service request data corresponding to the identification information) with the status response 220 into a multi-part response 218 or service request response. The multi-part response 218 or service request response, is supplied to the link server device 208 as an HTTP response, via Internet 204. As indicated above, the multi-part response 218 is formatted into one of the content-types of data that the link server device 208 is able to accept and process. Further, the multi-part response 218 indicates the type of service (service command) to be executed in association with the service request data. Accordingly, the multi-part response 218 contains a status response 220 (HDML response), the service request data which is formatted with respect to the content-type, and a service command. In an alternate embodiment, the content-type format, rather then the service command, could be used to identify the type of service to be performed in association with the service request data.

Upon receipt of the multi-part response 218, the link server 208 examines the multi-part response 218 to determine the type of service (service command) to be performed in association with the service request data. Accordingly, the link server 208 decomposes the multi-part response 218 into the service request data 222 and the status response 220. Upon determination of the type of service requested (service command), the link server 208 then executes the service command indicated in the multi-part response 218. Correspondingly, the link server 208 forwards or supplies the service request data 222 to a corresponding proxy service or service device 214 that is configured to perform the particular service (service command) indicated in the multi-part response 218. After the execution of the service command, the link server 208 supplies the status response 220 to the client device 206, the status response 220 indicating the original service request 212 has been fully processed.

Alternately, a copy of the service request data 222 could be supplied to the client device 206, along with the status response 220, to allow the user of the client device 206 to view the service request data 222.

Figure 3:
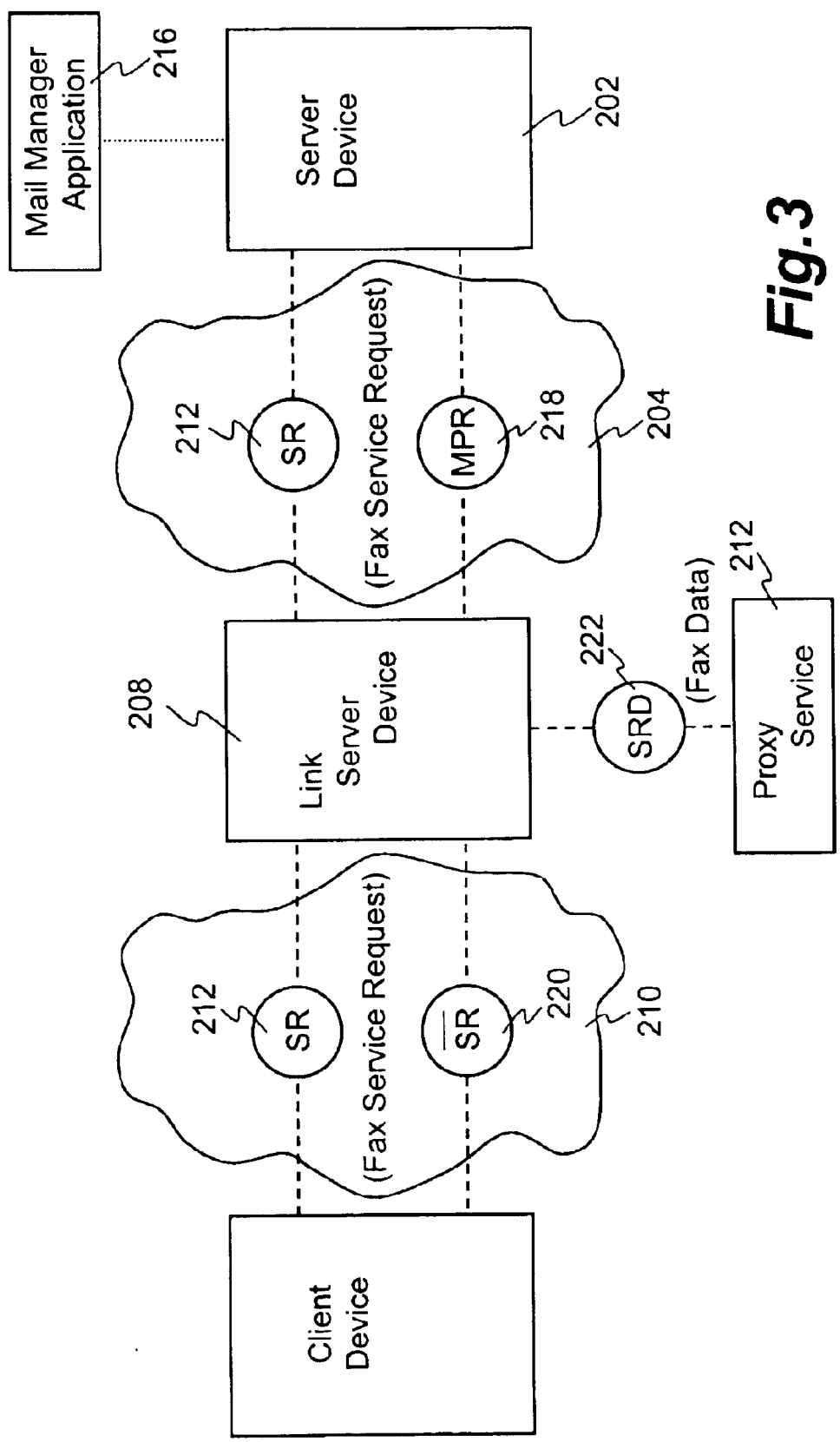
FIG. 3 illustrates an embodiment of the communication system of FIG. 2 within the context of processing a fax service request.

FIG. 3 illustrates an example of the processing of a service request using the functional block diagram of FIG. 2. More specifically, FIG. 3 illustrates the processing of a "fax" service request for an e-mail message using a mail manager application. Although the following example is illustrated in the context of a fax service request, it is understood that the present invention is applicable to a variety of different service requests and is not meant to limit the applicability of the present invention to illustrated type of service request. Further, the present example is directed to the retrieval of an e-mail message from a network, however, it is understood that the present invention is capable of retrieve any type of data from any type of network.

With reference to FIG. 3, the user of the client device 206 first initiates a communication session request via the client device 206, through airnet 210, to the link server 208. Once the communication session is established, the user of the client device 206 selects or inputs service selection data into a selectable user interface contained in the client device 206. The selectable user interface in the current example would comprise a fax user interface, wherein the fax user interface has an corresponding service application, in this case a mail manager application 216, used in the processing of different fax service requests.

Accordingly, the mail manager application 216 is configured to provide a fax user interface for inputting or selecting information regarding the faxing of a particular e-mail message. Therefore, the user inputs or selects fax service selection data via the fax user interface, wherein the fax service selection data corresponds to the select e-mail message contained in a particular network or database. In the user interface, the particular e-mail message is selected and the fax number corresponding to a desired fax location is entered.

As such, the user of the client device 206 selects a particular fax task or function, which is to be applied to the e-mail message, by selecting or inputting the corresponding fax service selection data associated with the desired fax task or function into the fax user interface. Correspondingly, the client device 206 generates a fax service request 212 based upon the fax service selection data selected from, or inputted into, the fax user interface of the client device 206. The fax service request 212 indicates that the user of the client device 206 has requested a fax service to be performed in connection with particular data (i.e.: e-mail message).

The fax service request 212 contains service information, generated from the fax service selection data, comprised of identification information corresponding to the select e-mail, such as a URL (Universal Resource Locator), or other identifier, which identifies or describes the e-mail message contained in a particular network or database. Additionally, the service information indicates the type of service requested (i.e.: fax service), the identification of the data type associated with the service request (i.e.: e-mail message), and the destination for a response to the service request (fax number and location).

Upon generation of the fax service request 212, the client device 206 supplies or transmits the fax service request 212, containing the service information, to the link server 210. Accordingly, upon receipt of the fax service request 212, the link server 208 converts the transfer protocol associated with the fax service request 212 from an HDTP protocol to an HTTP protocol. Further, the link server 208 attaches link server information to the fax service request 212 which indicates the types of fax services or functions that the link server device 304 is capable of processing or executing with respect to the selected fax service request 212. Additionally, the link server information identifies the content-types of fax data that the link server device 208 is able to accept and process.

The fax service request 212, containing the service information and link server information, is then forwarded, via the Internet 204, from the link server device 208 to the server device 202. Accordingly, the server device 202 selects and uses a particular service application associated with the service request 212, which in the present example is a mail manager application 216, in order to process the fax service request 212. Accordingly, the server device 202, through the mail manager application 216, uses the service information contained in the fax service request 212 to locate the e-mail message, also known as service request data, in an associated network or database, such as a mail manager database. In the present example, for instance, the server device 202, via the mail manager application 216 locates and retrieves the e-mail message associated with the identification information from a database corresponding to the mail manager application 216. Therefore, the server device 202, through the mail manager application 216, locates the e-mail message or service request data, which corresponds to the identification information contained in the service information, from an associated database, such as a mail manager database.

The server device 202 then supplies the service request data (e-mail message) to the selected service application which processes the service request data in accordance with the link server information and the service information contained in the fax service request 212. As mentioned above, the link server information indicates the types of services or functions, associated with the service request 212, that the link server device 208 is capable of processing, in addition to the content-types of data that the link server device 208 is able to accept and process. Correspondingly, the mail manager application 216, after locating the service request data, processes the service request data into an appropriate format for use by the link server 208, based upon one of the content-types of data that the link server device 208 is able to accept and process. Further, the server device 202, via the mail manager application 216, includes the service information, or other similar data, when formatting the service request data to indicate the type of service requested (service command) to the link server 208. In the present example, for instance, the mail manager application 216 associated with the server device 202 would locate and retrieve the e-mail message associated with the particular identifier or URL from an applicable database identified by the mail manager application 216. Upon locating and retrieving the e-mail message corresponding to the identifier contained in the fax service request 212, the mail manger application 216 generates a facsimile form of the selected e-mail message in one of the content-types that the link server device 208 is able to accept and process. Additionally, the mail manager application 216 may be configured to generate a fax cover page which contains details regarding the fax service request 212, such as the sender's name, subject matter, fax number, or any other type of desired data. Therefore, the selected e-mail message has been formatted in accordance with the parameters specified in the original fax service request 212, resulting in formatted fax service request data. Further, the server device 202, via the mail manager application 216, includes the service information, or other similar data, associated with the fax service request 212, when formatting the service request data to indicate the type of service requested (service command) to the link server 208.

The mail manager application 216 then processes the service request data into an appropriate format, with the service command information included, for use by the link server 208. Correspondingly, the mail manager application 216 generates a status response 220 (HDML response) which is eventually supplied to the client device 206, and displayed to the user thereof, upon final execution of the fax service request 212. The status response 220 supplies the client device 206 with information indicating that the fax service request 212 has been fully processed by the link server 208. Accordingly, the server device 202 combines the fax service request data (i.e.: formatted fax service request data containing the service command) with the status response 220 into a multi-part response 218, also known as a service request response. The multi-part response 218 or service request response is supplied to the link server device 208 as an HTTP response, via Internet 204. As indicated above, the multi-part response 218 is formatted into one of the content-types of data that the link server device 208 is able to accept and process. Further, the multi-part response 218 indicates the type of service request (service command) to be executed in association with the fax service request data. Accordingly, the multi-part response 218 contains a status response 220 (HDML response), the fax service request data which is formatted with respect to the content-type (fax data format), and service command (order to fax). In an alternate embodiment, the formatted content-type (fax data format), rather then the service command (order to fax), could be used to identify the type of service to be performed in association with the fax service request data.

Upon receipt of the multi-part response 218, the link server 208 examines the multi-part response 218 to determine the type of service to be performed (service command) in association with the fax service request data. Accordingly, the link server 208 decomposes the multi-part response 218 into the fax service request data 222 and the status response 218. Upon determination of the type of service requested (service command), the link server 208 then executes (i.e.: order to fax the e-mail message) the particular service (service command) indicated in the multi-part response 218. Correspondingly, the link server 208 forwards or supplies the fax service request data 222 to a corresponding proxy service or service device 214 that is configured to perform the particular fax service (service command) indicated in the multi-part response 218. In the present example, the proxy service or service device 214 would be a device configured to fax the fax service request data 222 to the fax location specified in the service command. After the execution of the particular fax service (service command) indicated in the multi-part response 218, the link server 208 supplies the status response 220 to the client device 206, the status response 220 indicating that the original fax service request 212 has been fully processed.

Alternately, a copy of the fax service request data 222 could be supplied to the client device 206, in addition to the status response 220, to allow the user of the client device 206 to view the fax service request data 222.

Figure 4:
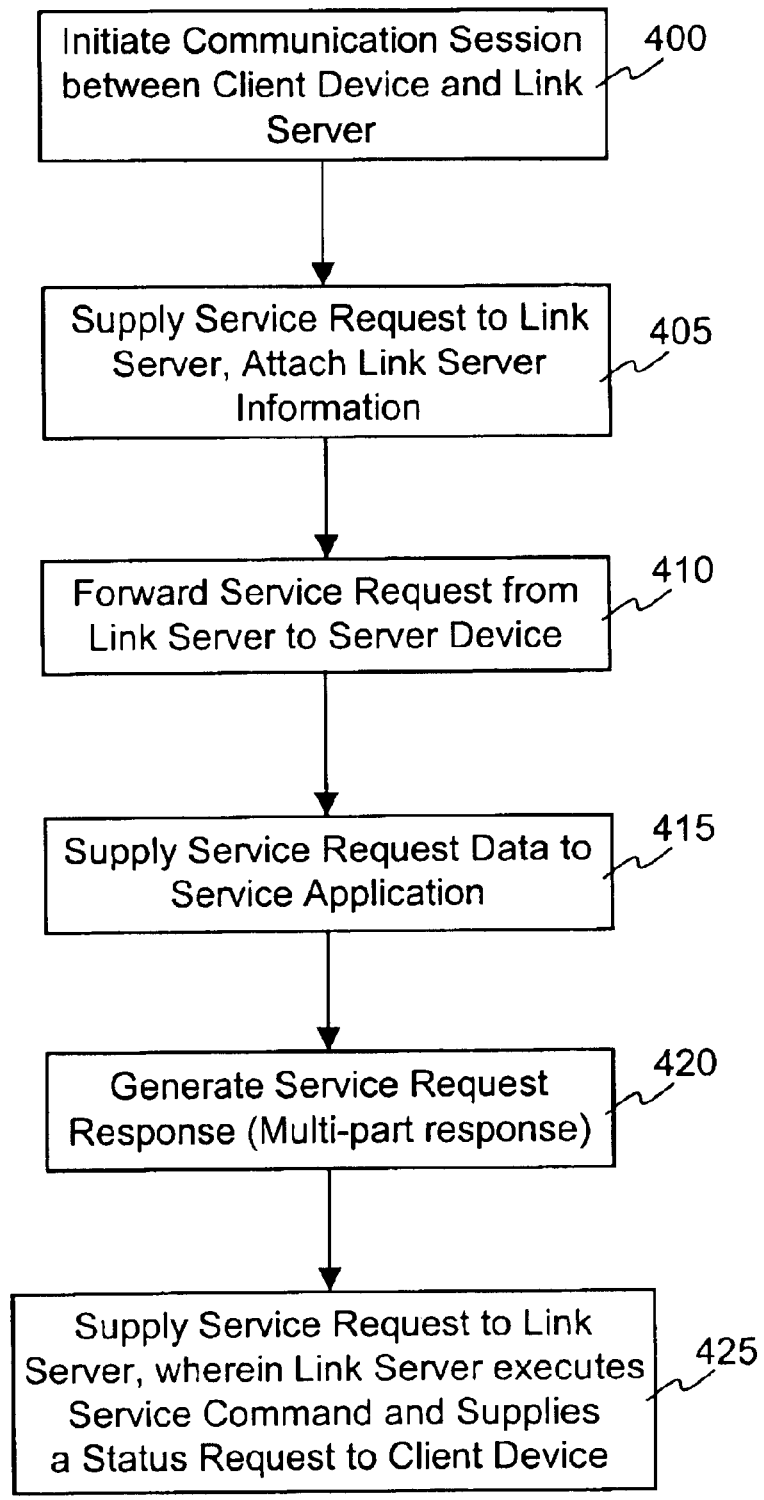
FIG. 4 illustrates an embodiment of the operation of the communication system of FIG. 2, via a flow diagram, illustrating the operation of the system within the context of processing a print service request.

FIG. 4 illustrates, in a flow diagram, an embodiment of a method for processing a service request within the context of the functional block diagram of FIG. 2. More specifically, FIG. 4 illustrates the processing of a HTML document print service request (print service request). Although the following example is illustrated in the context of a print service request, it is understood that the present invention is applicable to a variety of different service requests and is not meant to limit the applicability of the present invention to this type of service request. Further, the present example is directed to the retrieval and printing of an HTML document from a network, however, it is understood that the present invention is capable of retrieve any type of data from any type of network.

With reference to FIG. 4, at 400, the user of the client device 206 first initiates a communication session request via the client device 206, through airnet 210, to the link server 208. Once the communication session is established, the user of the client device 206 selects or inputs service selection data into a selectable user interface contained in the client device 206. The selectable user interface in the current example would comprise a HTML document print user interface (print user interface), wherein the print user interface has a corresponding service application, in this case a print manager application 216, used in the processing of different service requests. Accordingly, the print management application 216 is configured to provide a print user interface for inputting or selecting information regarding the printing of a particular HTML document. Accordingly, the user would input or select print service selection data at the print user interface, wherein the print service selection data corresponds to the select HTML document contained in an associated network or database. In the print user interface, the-particular HTML document is selected and the printer identification (Printer ID) corresponding to a desired printer location is entered.

As such, the user of the client device 206 selects a particular print task or function to be applied to the HTML document by selecting or inputting the corresponding print service selection data associated with the desired print task or function into the print user interface. Correspondingly, the client device 206 generates a print service request 212 based upon the print service selection data selected from, or inputted into, the print user interface of the client device 206. The print service request 212 indicates that the user of the client device 206 has requested a print service to be performed in connection with particular data (i.e.: HTML document).

The print service request 212 contains service information, generated from the print service selection data, comprised of identification information corresponding to the HTML document, such as a URL (Universal Resource Locator), or other identifier, which identifies or describes the HTML document contained in a particular network or database. Additionally, the service information indicates the type of service requested (i.e.: print service), the identification of the data type associated with the service request (i.e.: HTML document), and the destination for a response to the service request (Printer ID and location).

At 405, upon generation of the print service request 212, the client device 206 supplies or transmits the print service request 212, containing the service information, to the link server 210. Accordingly, upon receipt of the print service request 212, the link server 208 converts the transfer protocol associated with the print service request 212 from an HDTP protocol to an HTTP protocol. Further, the link server 208 attaches link server information to the print service request 212 which indicates the types of print services or functions that the link server device 208 is capable of processing or executing with respect to the selected print service request 212 Additionally, the link server information identifies the content-types of print data that the link server device 208 is able to accept and process.

Next at 410, the print service request 212, containing the service information and link server information, is then forwarded, via the Internet 204, from the link server device 208 to the server device 202. Accordingly, the server device 202 selects and uses a particular service application, which in the present example is the print manager application 216, associated with the print service request 212, in order to process the print service request 212. Accordingly, the server device 202, through the print manager application 216, uses the service information contained in the print service request 212 to locate the HTML document or service request data, in an associated network or database, such as a HTML document database or the Internet 204. As such, the print manager application 216 can be configured to utilize a web browser service to obtain the desired HTML document from the Internet 204. In the present example, for instance, the server device 202, via the print manager application 216, locates and retrieves the HTML document associated with the identification information from a database corresponding to the print manager application 216, or alternately from the Internet 204. Therefore, the server device 202, through the print manager application 216, locates the HTML document, also known as service request data, which corresponds to the identification information contained in the service information.

At 415, The server device 202 supplies the service request data (HTML document) to the print manager application 216 which processes the service request data in accordance with the link server information and the service information contained in the print service request 212. As mentioned above, the link server information indicates the types of services or functions, associated with the service request 212, that the link server device 208 is capable of processing, in addition to the content-types of data that the link server device 208 is able to accept and process. Correspondingly, the service application, after locating the service request data, processes the service request data into an appropriate format for use by the link server 208, based upon one of the content-types of data that the link server device 208 is able to accept and process. Further, the server device 202 includes the service information when formatting the service request data to indicate the type of service requested (service command) to the link server 208.

In the present example, for instance, the print manager application 216 associated with the server device 202 would locate and retrieve the HTML document associated with the particular identifier or URL from a database corresponding to the print manager application 216, or alternately from a network, such as the Internet 204. Upon locating and retrieving the HTML document corresponding to the identification information contained in the print service request 212, the print manger application 216 generates a data print form of the selected HTML document in one of the content-types that the link server device 208 is able to accept and process. Additionally, the print manager application 216 may be configured to generate a print cover page which contains details regarding the print service request 212, such as the sender's name, subject matter, printer ID, or any other type of desired data. Therefore, the selected HTML document has been formatted in accordance with the parameters specified in the original print service request 212, resulting in formatted print service request data. Further, the server device 202, via the print manager application 216, includes the service information, associated with the print service request 212, when formatting the print service request data to indicate the type of service requested (service command) to the link server 208.

At 420, the print manager application 216 processes the print service request data into an appropriate format, with the service command information included, for use by the link server 208. Correspondingly, the print manager application 216 generates a status response 220 (HDML response) which is eventually supplied to the client device 206, and displayed to the user thereof, upon final execution of the service request 212. The status response 220 supplies the client device 206 with information indicating that the print service request 212 has been fully processed by the link server 208. Accordingly, the server device 202 combines the print service request data (i.e.: formatted print service request data and service information) with the status response 220 into a multi-part response 218, also known as a service request response. The multi-part response 218 or service request response is supplied to the link server device 208 as an HTTP response, via Internet 204. As indicated above, the multi-part response 218 is formatted into one of the content-types of data that the link server device 208 is able to accept and process. Further, the multi-part response 218 indicates the type of service request (service command) to be executed in association with the print service request data. Accordingly, the multi-part response 218 contains a status response 220 (HDML response), the print service request data which is formatted with respect to the content-type (print data format), and service command (order to print). In an alternate embodiment, the formatted content-type (print data format), rather then the service command (order to print), could be used to identify the type of service (service command) to be performed in association with the print service request data.

Accordingly, at 425, the multi-part response 218 is then supplied to the link server 208, wherein the link server 208 examines the multi-part response 218 to determine the type of service to be performed (service command) upon the print service request data. Accordingly, the link server 208 decomposes the multi-part response 218 into the print service request data 222 and the status response 220. Upon determination of the type of service requested (service command), the link server 208 then executes (i.e.: order to print HTML document) the particular service indicated (service command) in the multi-part response 218. Correspondingly, the link server 208 forwards or supplies the print service request data 222 to a corresponding proxy service or service device 214 that is configured to perform the particular print service indicated (service command) in the multi-part response 218. In the present example, the proxy service or service device 214 would be a device configured to print the print service request data 222 to the printer ID and location specified in the service command. After the execution of the particular print service indicated in the multi-part response 218, the link server 208 supplies the status response 220 to the client device 206, the status response 220 indicating that the original service request 212 has been fully processed.

Alternately, a copy of the print service request data 222 could be supplied to the client device 206, in addition to the status response 220, to allow the user of the client device 206 to view the print service request data 222.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of embodiments.

What is claimed is:

1. A system configured to manage and process service requests within a data network, comprising:
    a link server device configured to receive a service request from an interactive communication device, wherein the link server device attaches link server information to the service request, the link server information indicating functions the link server device is capable of executing;
    a server device configured to receive the service request from the link server device and supply a service request response based upon information in the service request and the link server information; wherein the service request response comprises a multi-part response including service request data and a status response; and
    wherein the link server executes a service command upon receipt of the service request response and supplies the status response to the interactive communication device.

2. The system of claim 1, wherein the interactive communication device comprises an interactive mobile communication device.

3. The system of claim 1, wherein the server device utilizes a service application for generating the service request response.

4. The system of claim 1, wherein the status response supplied to the interactive communication device contains the service request data.

5. The system of claim 4, wherein the service command is contained in the multi-part response, the service command indicating a service to be executed in association with the service request data.

6. The system of claim 5, further comprising a service device coupled to the link server device, wherein the service device performs the service indicated by the service command.

7. The system of claim 1, wherein the link server device performs data communication between the interactive communication device and the server device.

8. A method of managing and processing service requests within a data network, the method comprising:
    receiving a service request from an interactive communication device;
    attaching link server information to the service request, the link server information indicating functions a link server device is capable of executing;
    forwarding the service request including the attached link server information to a server device configured to supply a service request response based upon information contained in the service request; wherein the service request response comprises a multi-part response including service request data and a status response;
    executing a service command upon the receipt of the service request response; and
    supplying the status response to the interactive communication device.

9. The method of claim 8, wherein the service request is to output data from the server device to a terminal chosen by a user of the interactive mobile communication device.

10. The method of claim 8, wherein the server device utilizes a service application for generating the service request response.

11. The method of claim 8, wherein the status response supplied to the interactive communication device contains the service request data.

12. The method of claim 8, wherein the service command is contained in the multi-part response, the service command indicating a service to be executed in association with the service request data.

13. The method of claim 12, wherein the service device performs the service indicated by the service command.

14. The method of claim 8, wherein the link server device performs data communication between the interactive communication device and the server device.

15. A system containing program code for managing and processing service requests within a data network, the system comprising:
    first program code for supplying a service request to a link server device, wherein the link server device comprises program code for attaching link server information to the service request, the link server information indicating functions the link server device is capable of executing;
    second program code for supplying the service request to a server device configured to supply a service request response based upon information contained in the service request and the link server information; wherein the service request response comprises a multi-part response including service request data and a status response;
    third program code for executing a service command upon the receipt of the service request response; and
    fourth program code for supplying the status response to a source of the service request.

16. The system of claim 15, wherein the service request is supplied to the link server device by an interactive mobile communication device.

17. The system of claim 15, wherein the server device utilizes a service application for generating the service request response.

18. The system of claim 15, wherein the status response supplied to the interactive communication device contains the service request data.

19. The system of claim 15, wherein the service command is contained in the multi-part response, the service command indicating a service to be executed in association with the service request data.

20. The system of claim 19, further comprising program code for causing the service request indicated by the service command to be performed in a service device coupled to the link server device.

21. The system of claim 15, wherein the link server device performs data communication between the interactive communication device and the server device.

22. A method of managing and processing service requests within a data network, the method comprising:

generating a service request upon receiving a request from a wireless network, the request originating from an interactive mobile communication device coupled to the wireless network, the service request including link server information attached by a link server device indicating functions the link server device is capable of executing;

forwarding the service request to a server device configured to supply a service request response based upon information contained in the service request; wherein the service request response comprises a multi-part response including service request data and a status response; and executing a service command upon the receipt of the service request response.

23. The method of claim 22, wherein the service request is to output data from the server device to a terminal chosen by a user of the interactive mobile communication device.

24. The method of claim 22, said method further comprising forwarding the status response to the interactive mobile communication device after said executing of the service command is done.

25. The method of claim 22, wherein the service command indicates a service to be executed in association with the service request data.

26. A method of managing and processing service requests within a data network, the method comprising:

receiving an input from a user to output service request data to a terminal; the service request data accessible from a server device coupled to a landnet;

generating a service request in response to the input; the service request comprising an address identifier identifying a link server remotely located and coupled between a wireless network and the landnet;

sending the service request to the link server through the wireless network, the link server attaching link server information to the service request, the link server information indicating functions a link server device is capable of executing; and receiving a status response from the link server after the service request is processed in the server device, wherein the status response is included in a multi-part response received in the link server when the service request is processed in the server device.

27. The method of claim 26, wherein the terminal is a printing device configured to permit the service request data output from the terminal to be viewed.

28. The method of claim 27, wherein the service request data are fetched from the server device to the link server through the landnet and the link server is configured to supply the service request data to the terminal for outputting.

29. The method of claim 28, the method further comprising:

receiving a status response from the link server when the service request data are successfully output on the terminal.

\* \* \* \* \*